Oct. 28, 1969   J. RICHEZ ET AL   3,475,627
COMBUSTION GENERATOR

Filed March 9, 1966   8 Sheets-Sheet 1

Jacques Richez, Andre Dubois,
Jean-Claude Bartentier,
Jean Thoris & Daniel Parizot
by:
Edwin E. Greigg

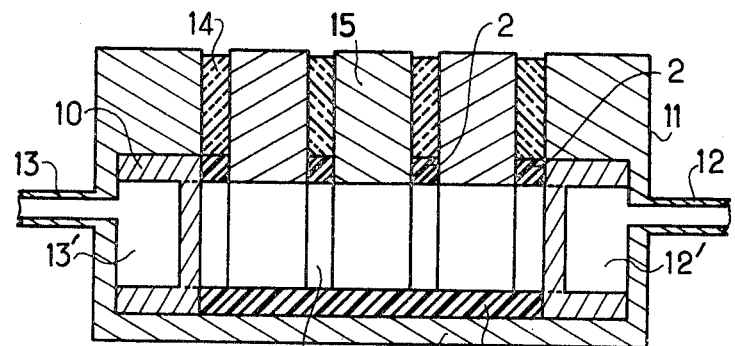
FIG. 4
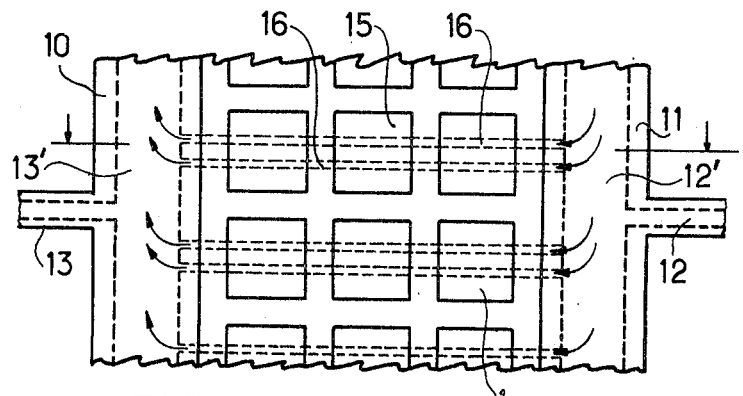
FIG. 5
FIG. 6
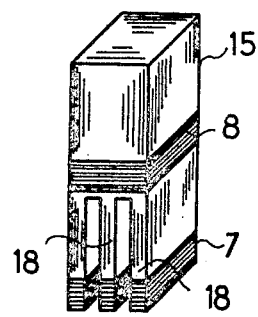

Oct. 28, 1969   J. RICHEZ ET AL   3,475,627
COMBUSTION GENERATOR

Filed March 9, 1966   8 Sheets-Sheet 4

Oct. 28, 1969   J. RICHEZ ET AL   3,475,627
COMBUSTION GENERATOR
Filed March 9, 1966   8 Sheets-Sheet 6

Oct. 28, 1969　　　J. RICHEZ ET AL　　　3,475,627
COMBUSTION GENERATOR

Filed March 9, 1966　　　　　　　　　　　8 Sheets-Sheet 7

United States Patent Office 3,475,627
Patented Oct. 28, 1969

3,475,627
COMBUSTION GENERATOR
Jacques Richez, Clamart, André Dubois, Orsay, Jean-Claude Battentier, Antony, Jean Thoris, Orsay, and Daniel Parizot, Paris, France, assignors to Compagnie Generale d'Electricite, Paris, France, a corporation of France
Filed Mar. 9, 1966, Ser. No. 533,038
Claims priority, application France, Dec. 27, 1965, 43,843; Jan. 28, 1966, 47,642
Int. Cl. H02k 45/00; G21d 7/02
U.S. Cl. 310—11                                13 Claims

ABSTRACT OF THE DISCLOSURE

The invention relates to a composite refrigerated heat resisting wall having a housing for a plurality of conductive prisms which are in contact with a first insulative member. Fluid control members positioned within the housing are arranged to direct flow of the fluid from the inlet port through the housing around the conductive prisms and out through an outlet port. An additional insulative means positioned in spaced relation to the first insulation provides a chamber for controlling the flow of fluid through the housing and about the prismatic members.

The present invention relates to a composite wall construction which is resistant to high temperatures, and more particularly an electrically insulated wall especially for combustion chambers or generators of the type known in the art as the "MHD" or magnetohydrodynamic generator.

A known method of manufacturing such wall consists, for example, in assembling metallic blocks by attaching them by screws onto an insulating plate, the blocks being further secured together by cement and comprising a plurality of channels for the circulation of a cooling fluid.

Such production presents various disadvantages notably of the realm of fluid tightness, mechanical strength and cost price (due to difficulty of production). Moreover, the fact that the metallic blocks must be provided with perforations or holes for the passage of the cooling fluid therethrough excludes the use of metallic pieces of small dimensions.

The present invention makes it possible to remedy the shortcomings of the above-mentioned prior art devices.

One object of the present invention is to provide a composite wall resistant to high temperatures.

Another object of the present invention is to produce a wall which can be easily cooled and also has a good mechanical resistance to the pressure of cooling fluids.

Still another object is to produce a wall allowing a good heat transfer between the hot gases of the combustion chamber and the cooling fluid.

A further object of this invention is to produce an assembly constructable wall quickly and cheaply.

Other objects and advantages will become apparent from the following description taken in conjunction with the accompanying drawings, in which:

FIGS. 4 and 5 are respectively a vertical section and overhead view of another embodiment of the wall according to the invention;

FIG. 6 is a view of one of the metallic members forming the wall according to FIGS. 4 and 5;

According to the invention, the wall comprises a plurality of regularly stepped metallic members 1 and held in place by two layers 2 and 3 made of an assembly material the nature of which will be defined below.

Figure 3:
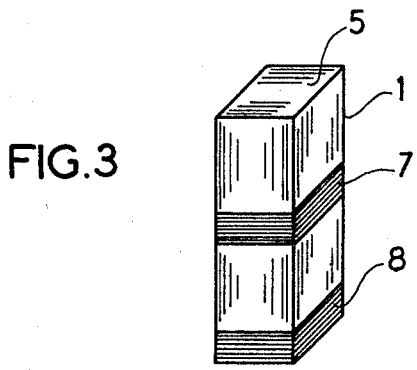
FIG. 3 is a view of one of the metallic members forming a part of the wall according to FIGS. 1 and 2.

According to the embodiment illustrated by FIG. 3, each metallic member 1 appears in the form of a prism or parallelepiped having a terminal small face 5 which is intended to form a part of the surface of the wall which will be subjected to hot gases of the magnetohydrodynamic generator. The lateral face of the member 1 comprises parts 7 and 8, the surface of which is chemically and mechanically treated, for instance, by projecting sand, milling, electro-erosion etc., so as to improve the adherence thereto of the material forming the layers 2 and 3 of the metal forming the member 1.

Members 1 are arranged in regularly alternated rows, so as to define rectilinear channels 6 in which a cooling fluid flows.

The wall according to the invention comprises, furthermore, a metallic box having a bottom 9 and lateral walls 10 and 11 through which pass two ducts 12 and 13.

These ducts emerge, respectively, into chambers 12' and 13' which are intercommunicating by a plurality of channels the walls of which are formed by the lateral surfaces of the aligned metallic members and the lateral surfaces of layers 2 and 3. The ducts 12 and 13 form, respectively, the input and output ducts of a cooling fluid circulating under pressure in the channels of the walls. This magnetohydrodynamic generator wall can reach relatively high temperatures and the pressure of the cooling fluid can be quite high and the assembly material according to the layers 2 and 3 must present certain mechanical characteristics. In particular, the adherence of this material to the metal of the members 1 must be strong enough to guarantee the tightness of the cooling channels; this material must furthermore be quite flexible at low as well as high temperatures in order to resist the effort exerted by the cooling fluid under pressure without breaking. The assembly material must assure a good electrical insulation between the metallic members 1.

Among the materials able to be used advantageously are the elastomeric silicones, the "Shore" hardness coefficient of which comes between 40 and 90. According to a preferred embodiment of the invention, the preferred elastomeric silicone is that which is known under the trademark Silastic which is manufactured by the Dow Corning Corporation. In the case of the use of Silastic as the assembly material, the above-mentioned chemical treatment consists in pulverizing, on the already milled or sanded or eroded portion of metal, a product commercially sold under the trademark Primaire also made by the above-mentioned corporation.

Figure 1:
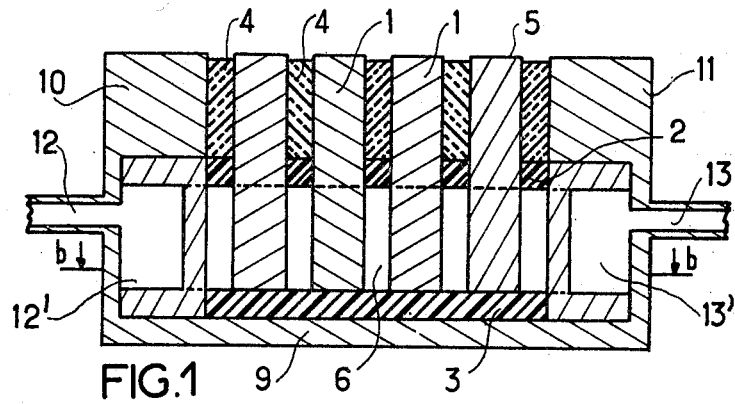
FIG. 1 is a cross-sectional view of a generator rear wall taken along line A—A of FIG. 2.

The assembly material forming the layers 2 and 3 is protected from very high temperatures which normally prevail in the magnetohydrodynamic combustion chamber by one or several layers of refractory material separated or not with layers of gas. In FIG. 1, a single refractory layer indicated at 4 has been shown as an example.

FIG. 4 is a sectional view of an embodiment of the wall according to the invention, and FIG. 5 is a plan view of this wall.

Figure 2:
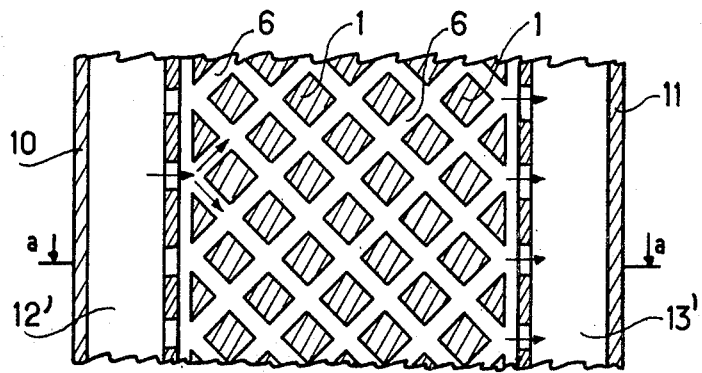
FIG. 2 is a cross-sectional view of a generator wall along line B—B of FIG. 1.

The wall illustrated by FIGS. 4 and 5 is distinguished from the wall of FIGS. 1 and 2 by the fact that the metallic members indicated here as 15 include a plurality of slots 18 at their lower end as can be seen best in FIG. 6. The cooling channels 16 thus provided are obtained by disposing the elements 15 in uniform rows and by carefully aligning the slots of the adjacent juxtaposed elements, for instance as shown by FIG. 5. These channels 16 are thus defined by the spaced lateral surfaces forming the bifurcated walls of the elements 15 and layers 2 and 3.

The metallic members disclosed herein and from which the wall is constructed according to the invention, do not necesarily assume the form of a rectangular parallelepiped, for in certain cases, more complicated geometrical shapes can also prove to be advantageous.

Figure 7:
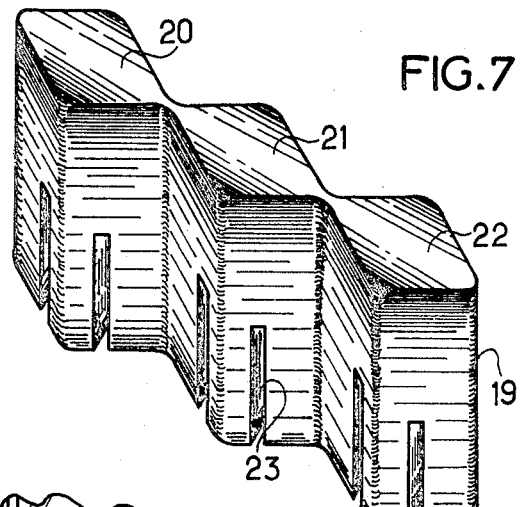
FIG. 7 is a view of another embodiment of the metallic member forming a part of the wall according to the invention.
Figure 8:
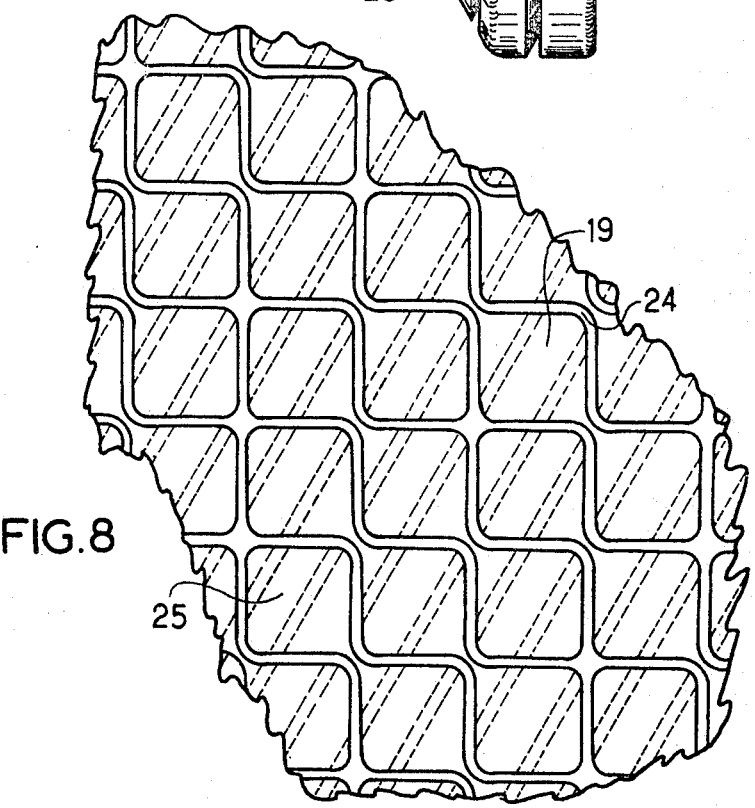
FIG. 8 is an overhead view of the wall formed with a member according to FIG. 7.

FIG. 8 shows an overhead view of the surface of a wall formed by assembling a series of the elements shown in FIG. 7. Further, as shown in this view the elements 19 are arranged in a correlated series adjacent to one another in an advancing sidewise stepped manner, the arrangement being such that the elements 19 are spaced apart as shown at 24 which serves for positioning of the various layers of the assembly material as has been described with reference to FIGS. 1–5. As explained hereinbefore the parts of the elements 19 which are in contact with the assembly material have also undergone an earlier mechanical and chemical treatment.

The elements 19 are arranged so that the slots 23 which extend therethrough are aligned and form a network of rectilinear channels. The use of such rectilinear channels has the distinct advantage of reducing the pressure losses which could occur if the cooling fluid were to be pumped along a tortuous circuit. The space between the upper ends of the metallic members is filled with a refractory material.

In the three embodiments of the wall construction thus far described it is to be noted that the assembly material undergoes shearing stresses. This is an advantage which allows for the production of walls having thinner assembly layers. The ratio between the cooled area in the total area of the metallic members can be large which will improve thermic exchanges between the metal and the fluid.

Figure 9:
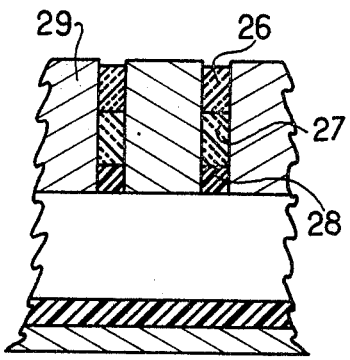
FIGS. 9, 10 and 11 are vertical sections of fragments of the wall according to the invention.

FIG. 9 illustrates a still further embodiment of the invention wherein the refractory layer comprises several layers such as 26, 27 made of different material and arranged on layer 28. The refractory materials are chosen so as to obtain the maximum yield of the magnetohydrodynamic generator and fully take into account the nature of the material forming the layer 28. It is believed that it will be apparent from the drawing of FIG. 9. that heat flux passes from the hot gases of the combustion chamber to the layer 26 and thence to the layer 27 and from the layer 27 to the layer 28. It will thus be understood that the hot flux also passes from the layers 26 and 27 to the member 29. The beter the hot evacuation is, the higher is the yield of the generator.

The material forming the layer 26 is therefore chosen from among materials having a relatively high thermal conductivity, preferably higher than 1.5 w./m. ° C., said material being preferably dense. The layer 27 must have a relatively low thermal conductivity, in any case not higher than that of the layer 28. For example, the material constituting the layer 26 is a material such as the aluminous concrete or a compound of alumina and lanthanum.

Another advantage of the utilization for the layer 26 of a dense material is that it prevents the product of decomposition of the feed of hot gases from penetrating the wall hence avoiding short circuits between the metallic members.

The material of the layer 27 comprises, for example, a material such as mica sheets, fiber glass, asbestos compounds such as that known under the trademark Asbestolux, talcum powder, divided alumina powder, silicate and alumina wires in bulk, asbestos and kieselguhr compound, such as that known under the trademark Amosil.

Figure 10:
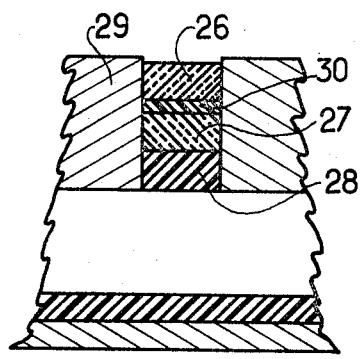

When the layer 27 is porous, it is possible, before positioning the layer 26 thereover to add a further thin layer 30 (FIG. 10) which is intended to make the layer 27 tight and prevent the material of the layer 26 from blocking the pores of the layer 27 and such an arrangement would also increase the formal conductivity of this last layer. The layer 30 can be made of polymerizable material in a carrier, such as synthetic resin or natural resin, and can be decomposed without difficulty by heat during the first use of the wall.

Figure 11:
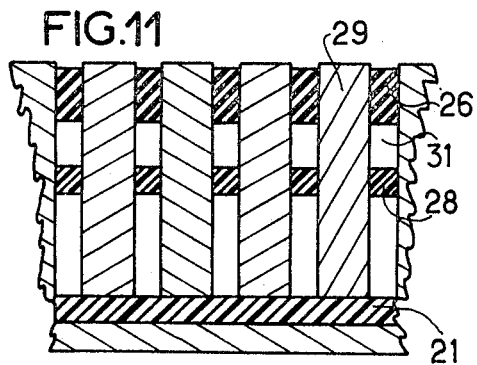

FIG. 11 shows another embodiment of the inventive concept in which a gas layer 31 is interposed between the aforementioned layers 26 and 28.

Figure 12:
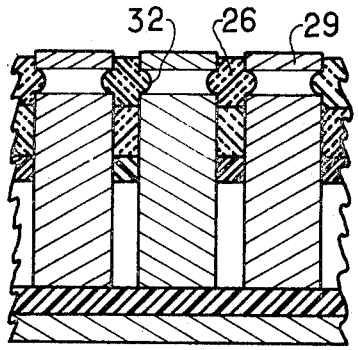
FIG. 12 illustrates an ordinary embodiment of the wall according to the invention.
Figure 13:
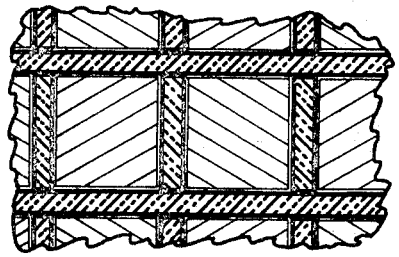
FIGS. 13, 14, 15 and 16 are overhead views of a wall according to the invention in the case where this wall comprises outer layers in a refractory material cut out before being put in place.
Figure 14:
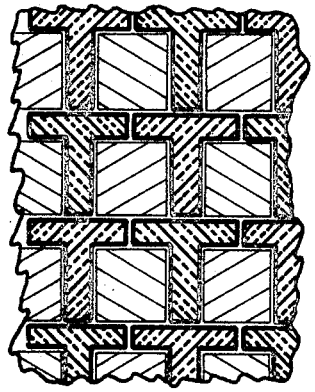
Figure 15:
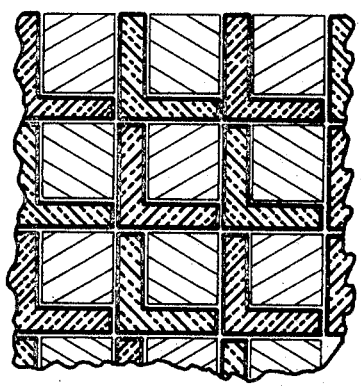
Figure 16:
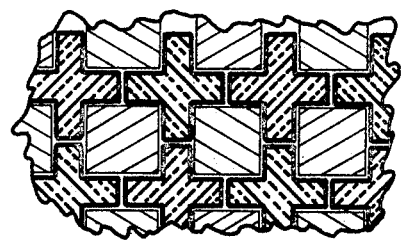

FIG. 12 shows still another embodiment according to which the metallic members 29 are provided adjacent to their upper end portions with a continuous groove or channel 32 which is adapted to accommodate the layer 26. With this arrangement it will be apparent that the groove 32 will improve the adherence of the metal to the refractory material of the layer 26. This is particularly advantageous in the event the layer 26 is porous.

In another embodiment, the outer layer of the refractory material can be formed by a plurality of adjacent elements having a simple shape and positioned so as to cover the whole of the free surface between the metallic members.

In the case of square-shaped metallic members, such as those shown in FIG. 1, the above-mentioned spacedly arranged members can be so held in correlation by means of components, the cross-sections of each of which are shown in FIGS. 13–16 respectively, and comprise T's, right angles, cruciforms, crosses or L's.

This arrangement facilitates the assembly of the outer layer of refractory material particularly where the nature of the material prevents the continuous manufacture of this layer.

The present invention relates to a manufacturing method for a wall such as that described above. In order to facilitate the description of the manufacturing method, reference will be made to the embodiment illustrated by FIGS. 4–6, but it is obvious that the same method can also be applied to embodiments illustrated by the other figures.

The first stage consists of a series of treatments intended to prepare portions of the surface of the metallic members for a better adherence to the assembly material. These treatments may comprise milling, blasting by abrasive material, such as sand. The areas so treated are then covered with an auxiliary compound. When the assembly material is the "Silastic," the auxiliary compound improving the adherence is the product referred to above as "Primaire."

Figure 17:
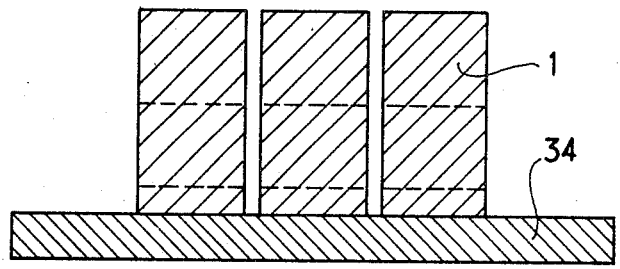
FIGS. 17, 18, 19, 20, 21, 22, 23, 24 and 25 are sectional and overhead views showing the different steps in the manufacturing process according to the invention.

In the next stage of the wall construction as shown in FIG. 17, the metallic members are arranged side by side in spaced relation on a mounting plate 34 in the position which they will finally occupy when the magnetohydrodynamic generator wall is completed.

Figure 18:
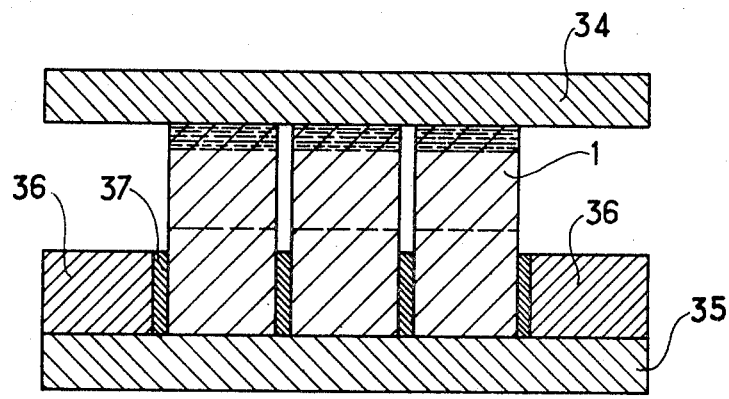

The plate 34 supporting the members 1 is then inverted and the assembly is placed on another plate 35 shown in FIG. 18. A frame means 36 is placed around members 1 in order to maintain them in a fixed position thus providing communicative spaces which will later be occupied by layers of refractory material and metallic terminal boxes.

Figure 19:
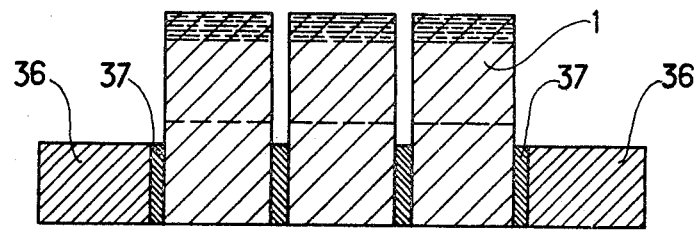

At this time the whole assembly is arranged in a heating chamber and heated to a temperature of between 60 to 90° C. A fusible alloy 37 as shown in FIG. 18 is then poured into the free space between the spacedly arranged members 1 as well as between the members 1 and the frame. After removing from the heating chamber and cooling the members 1 and the frame 36 are then held together by the alloy 37 and the plates 34 and 35 taken away, this stage of operation being best shown in FIG. 19.

Figure 20:
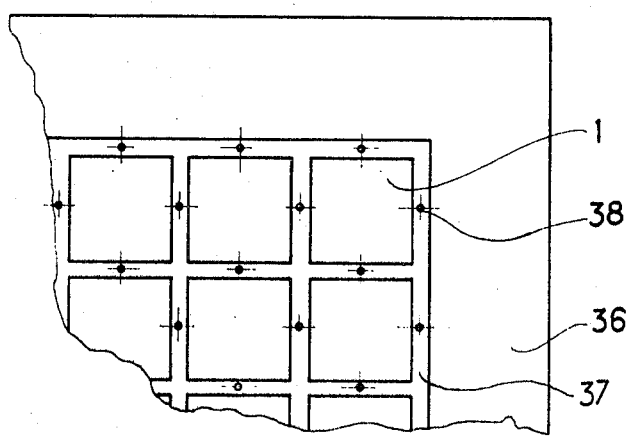
Figure 21:
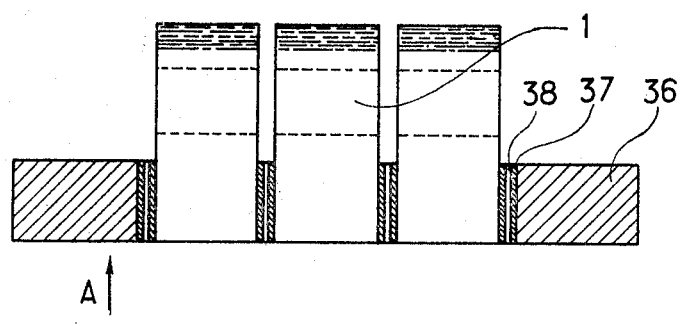

A plurality of holes 38 are then bored through the alloy 37 as best shown in FIGS. 20 and 21 which represent, respectively, a plan view and a cross-section.

As will be explained later, the assembly material will be injected through the holes 38.

Figure 22:
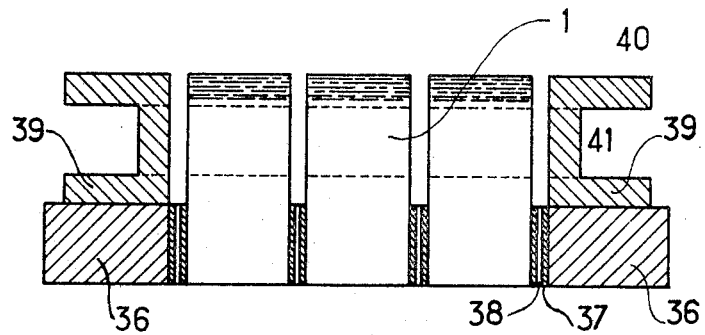

The next stage comprises associating a metallic shroud 39 relative to the frame 36. This shroud is intended to surround the space which will close the terminal chambers joining the different channels to the input and output channels of the cooling fluid. The wall of the shroud 39 includes means defining openings represented by two broken lines 40 and 41. These openings are adapted to be in alignment with the slots provided in the members 1 as will be understood by referring to FIG. 22.

Figure 23:
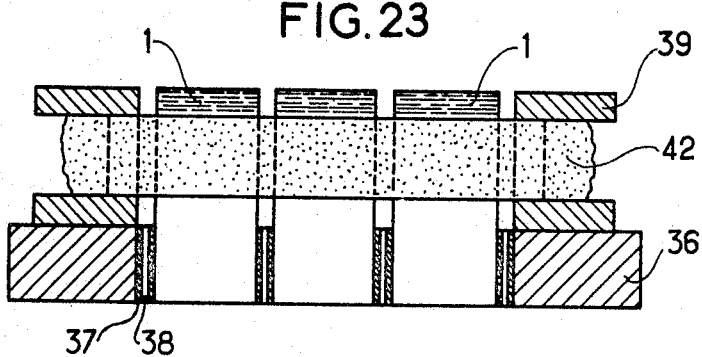
Figure 24:
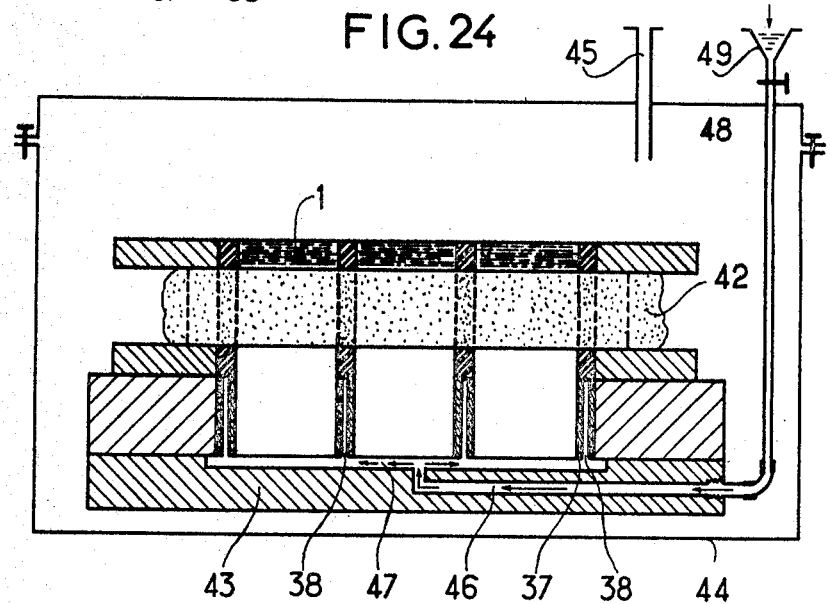

As shown in FIG. 23 all the space not intended to be filled with the assembly material is blocked by elongated sticks of neoprene or other suitable material such as shown at 42.

In the next stage, the unit thus obtained is placed on a support 43 inside a vacuum chamber diagrammatically illustrated at 44 provided with a suitable control opening 45. The support 43 includes a series of communicating channels such as designated at 46 which open upwardly into a free space 47 which communicates with the plurality of apertures or holes 38 which were previously described as being bored in the alloy 37. The channels, such as 46, are all joined together by a tube 48 to a tank 49 containing an assembly material such as that described hereinbefore.

According to a preferred embodiment of the invention, the assembly material is the one known under the trademark "Silastic."

This material is injected under pressure and will fill all the free spaces between the members 1 and the elongated sticks 42.

When polymerization has taken place, the support 43 and the frame 36 are taken away.

Figure 25:
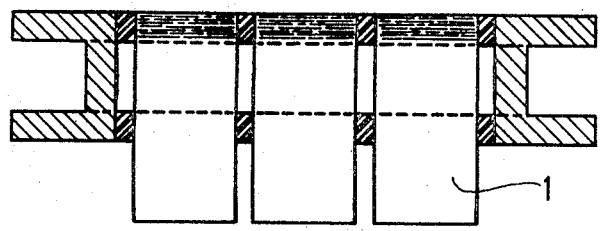

The thermal treatment necessary to the polymerization melts the fusible alloy 37 and a wall is obtained as that represented by FIG. 25.

The last stage is to put in place the metallic box 10–11–9 and to dispose of the refractory materials forming the layer 14 so as to obtain a wall such as that shown on FIG. 1.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. A wall structure comprising in combination,
    (a) a housing having an integral bottom wall, upstanding side walls and an open top, and inlet and outlet ports for cooling fluid flow in said side walls,
    (b) perforated cooling fluid flow control means forming first and second chambers adjacent to the inlet and outlet ports, respectively,
    (c) a first insulative means in said housing disposed on the inside surface of said bottom wall, and
    (d) a plurality of upstanding equally spaced elongated thermally conductive prism members arranged in contact with said first insulative means, each of said prism members being spaced from an adjacent prism member and the cooling fluid flow control means by a second insulative means thereby providing a third chamber, whereby cooling fluid introduced through the inlet port into said first chamber can flow through the third chamber defined by the prism members and the first and second insulative means, respectively, thence into said second chamber and exit through the outlet port.

2. A wall structure as claimed in claim 1, wherein the prism members include offstanding surface portions, said surface portions being inclined at an angle relative to the perforated flow control means.

3. A wall structure as claimed in claim 1, wherein the prism members include a bifurcated portion, said bifurcated portion being subjected to cooling fluid flow in said third chamber.

4. A wall structure as claimed in claim 1, wherein said prism members are assembled into units comprising at least three members, the edge portions of which are angularly connected in sequence, said units further including bifurcated portions adapted to permit cooling fluid flow therethrough.

5. A wall structure as claimed in claim 1, wherein the second insulative means comprises plural layers of insulation arranged in surface contact with each other.

6. A wall structure as claimed in claim 1, wherein the second insulative means comprises plural spaced layers of insulation with a gas provided between said layers.

7. A wall structure as claimed in claim 1, wherein at least one of said plural layers of insulation is arranged to conform to channels provided in said prism members.

8. A wall structure as claimed in claim 1, wherein the first and second insulative means have a Shore hardness coefficient of between 40 and 90.

9. A wall structure as claimed in claim 1, wherein the first and second insulative means have varying degrees of thermal conductivity.

10. A wall structure as claimed in claim 9, wherein the thermal conductivity of at least one layer is greater than 1.5 w./m. ° C.

11. A wall structure as claimed in claim 9, wherein at least one of the layers of insulation comprises a synthetic plastic material having a boiling point of less than 300° C.

12. A wall structure as claimed in claim 5, wherein at least one layer has a greater degree of porosity than an adjacent layer.

13. The method of assembling a magnetohydrodynamic generator comprising
    (a) positioning a plurality of members in spaced relation on a first mounting plate subsequent to a prior cleaning step,
    (b) inverting said treated members onto a second mounting plate whereupon the first mounting plate is removed and a frame is positioned about said plurality of members,
    (c) applying a fusible alloy around said members whereupon the assembly is cooled and the frame is removed,
    (d) boring a series of apertures in the cooled alloy,
    (e) positioning a shroud including spaced perforated walls around said members on said second mounting plate,
    (f) introducing preformed blocking material through the perforations in said shroud and into the spaces provided between said plurality of members, (g) placing the aforementioned assembly into a vacuum chamber forming a molding means, (h) supplying an assembly material to the mold forming area of said vacuum chamber and into the unblocked area surrounding the members to form a unified product, and (i) removing the finished product from the vacuum chamber.

References Cited
UNITED STATES PATENTS

| | | | |
|---|---|---|---|
| 3,161,788 | 12/1964 | Russell | 310—11 |
| 3,242,354 | 3/1966 | Novack | 310—11 |
| 3,281,614 | 10/1966 | Lindley | 310—11 |

DAVID X. SLINEY, Primary Examiner

U.S. Cl. X.R.

174—15; 310—54